US006909729B2

(12) United States Patent
Ibanescu et al.

(10) Patent No.: US 6,909,729 B2
(45) Date of Patent: Jun. 21, 2005

(54) DIELECTRIC WAVEGUIDE WITH TRANSVERSE INDEX VARIATION THAT SUPPORT A ZERO GROUP VELOCITY MODE AT A NON-ZERO LONGITUDINAL WAVEVECTOR

(75) Inventors: Mihai Ibanescu, Piatra Neamt (RO); John D. Joannopoious, Belmont, MA (US); Yoel Fink, Cambridge, MA (US); Steven G. Johnson, St. Charles, IL (US); Shanhui Fan, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 85 days.

(21) Appl. No.: 10/008,963

(22) Filed: Oct. 25, 2001

(65) Prior Publication Data

US 2002/0126713 A1 Sep. 12, 2002

Related U.S. Application Data

(60) Provisional application No. 60/243,565, filed on Oct. 26, 2000.

(51) Int. Cl.[7] .............................................. H01S 3/30
(52) U.S. Cl. .............................. 372/6; 372/26; 372/64
(58) Field of Search ........................... 372/6; 350/96.19, 350/96.1

(56) References Cited

U.S. PATENT DOCUMENTS

| 4,743,083 | A | * | 5/1988 | Schimpe ...................... 385/37 |
| 5,079,772 | A | * | 1/1992 | Negus et al. .................. 372/18 |
| 5,237,576 | A | * | 8/1993 | DiGiovanni et al. ........... 372/6 |
| 5,677,920 | A | * | 10/1997 | Waarts et al. .................. 372/6 |
| 5,774,221 | A | * | 6/1998 | Guerra ....................... 356/602 |
| 6,130,780 | A |  | 10/2000 | Joannopoulos et al. ..... 359/584 |
| 6,151,429 | A | * | 11/2000 | Kristensen et al. ........... 385/11 |
| 6,400,496 | B1 | * | 6/2002 | Epworth ................... 359/337.1 |
| 6,573,813 | B1 | * | 6/2003 | Joannopoulos et al. ..... 333/249 |
| 2002/0081055 | A1 | * | 6/2002 | Painter et al. ................. 385/2 |
| 2002/0101309 | A1 | * | 8/2002 | Chiu et al. .................. 333/243 |

FOREIGN PATENT DOCUMENTS

| WO | WO 00/22466 | 4/2000 |
| WO | WO00/22466 | 4/2000 |
| WO | WO 00/29883 | 5/2000 |
| WO | WO 00/65386 | 11/2000 |
| WO | WO00/65386 | 11/2000 |

OTHER PUBLICATIONS

R.F. Cregan et al., "Single Mode Photonic Band Gap Guidance of Light in Air," SCIENCE, vol. 285, pp. 1537–1539, Sep. 3, 1999.

J.C. Knight, "Photonic Band Gap Guidance in Optical Fibers," SCIENCE, vol. 282, pp. 1476–1478, Nov. 20, 1998.

R. A. Waldron. "Theory and Potential Application of Backward Waves in Nonperiodic Inhomogeneous Waveguides," PROC. IEE, Vol.111, No. 10, pp. 1659–1667, Oct. 1964.

M. Ibaneseu et al., "An All–Dielectric Coaxial Waveguide," SCIENCE, vol. 289, pp. 415–419, Jul. 21, 2000.

F. Brechet et al., "Analyis of Bandpass Filtering Behaviour of Singlemode Depressed–core–index Photonic–Bandgap Fibre," Electronics Letters, vol. 36, No. 10, pp. 870–872, May 11, 2000.

(Continued)

Primary Examiner—Hoanganh Le
Assistant Examiner—Dung T Nguyen
(74) Attorney, Agent, or Firm—Fish & Richardson P.C.

(57) ABSTRACT

Optical components including a laser based on a dielectric waveguide extending along a waveguide axis and having a refractive index cross-section perpendicular to the waveguide axis, the refractive index cross-section supporting an electromagnetic mode having a zero group velocity for a non-zero wavevector along the waveguide axis.

44 Claims, 10 Drawing Sheets

OTHER PUBLICATIONS

F. Brechet et al., "Singlemode Propagation into Depressed–core–index Photonic–Bandgap Fibre Designed for Zero for Zero–Dispersion Propagation as short Wavelengths," Electronics Letters, vol. 36. No. 6. pp. 514–515, Mar. 16. 2000.

Xu et al., "Asymptotic Analysis of Bragg Fibers," Optics Letters, vol. 25, No. 24, pp. 1756–1758, Dec. 15, 2000.

Fink et al., "A Dielectric Omnidirectional Reflector," SCIENCE, vol. 282, pp. 1679–1682, Nov. 27, 1998.

C. Martin de Sterke et al., "Differential Losses in Bragg Fibers," J. Appl. Phys., vol. 76(2), pp. 680–688, Jul. 15, 1994.

A.N. Lazarchik, "Bragg Fiber Lightguides," Radiotekhnika 1 elektronika, No. 1, pp. 32–38, 1988.

N.J. Doran et al., "Cylindrical Bragg Fibers: A Design and Feasibility Study for Optical Communications," Journal Of Lightwave Technology, vol. LT–1, No. 4, pp. 588–590, Dec. 1983.

M. Miyagi et al., "Transmission Charateristics of Dielectric–Coated Metallic Waveguide for Infrared Transmission: Slab Waveguide Model," IEEE Journal Of Quantum Electronics, vol. QE–19, No. 2, pp. 136–145, Feb. 1983.

M. Miyagi et al., "Design Theory of Dielectric–Coated Circular Metallic Waveguides for Infrared Transmission," Journal of Lightwave Technology, vol. LT–2, No. 2, pp. 116–126, Apr. 1984.

J. Harrington, "A Review of IR Transmitting, Hollow Waveguides," Fiber And Integrated Optics, 19:211–227, 2000.

T.A. Birks et al., "Seeing Things in a Hole New Light—Photonic Crystal Fibres," Proc. Spie, vol. 4532, pp. 206–219. 2001.

C. Ruan et al., "Propagation Properties of Overmoded Dielectric O–Waveguides," Science In China (Series A), vol. 33, No. 1. p. 86–98, Jan. 1990.

E.A.J. Marcatili et al., "Hollow Metallic and Dielectric Waveguides for Long Distance Optical Transmission and Lasers," The Bell System Technical Journal. 1783–1809, Jul. 1964.

D. M. Atkins et al., "Photonic band structure of guided Bloch modes in high index films fully etched through with periodic microstructure", Journal of Modern Optics, vol. 43, No. 5, pp. 1035–1053 (1996).

Yoel Fink et al., "Guiding Optical Light in Air Using an All–Dielectric Structure", Journal of Lightwave Technology, vol. 17, No. 11, pp. 2039–2041 (Nov. 1999).

M. Ibanescu et al., "An All–Dielectric Coaxial Waveguide", Science, vol. 289, No. 5478, pp. 415–419 (Jul. 21, 2000).

* cited by examiner

DIELECTRIC WAVEGUIDE WITH TRANSVERSE INDEX VARIATION THAT SUPPORT A ZERO GROUP VELOCITY MODE AT A NON-ZERO LONGITUDINAL WAVEVECTOR

CROSS-REFERENCE TO RELATED APPLICATIONS

This application claims priority to U.S. provisional patent application 60/243,565 filed Oct. 26, 2000, the contents of which are incorporated herein by reference.

FEDERALLY SPONSORED RESEARCH OR DEVELOPMENT

This invention was made with government support under Grant Number DAAG55-97-1-0366, awarded by the Army, Grant Number DE-FG02-99ER45778 awarded by the Department of Energy and Grant Number DMR-9808941 awarded by NSF. The government has certain rights in the invention.

BACKGROUND

Optical components are becoming increasingly more common in telecommunication networks. For example, waveguides such as optical fibers are used to carry information between different locations as optical signals. Such waveguides substantially confine the optical signals to propagation along a preferred path or paths. Similarly, other components such as sources, modulators, and converters often include guided regions that confine electromagnetic (EM) energy. Although metallic waveguides have a long history of use at longer wavelengths (e.g., microwaves), their usefulness as waveguides in the optical regime (e.g., 350 nm to 3 microns) is limited by their absorption. Thus, dielectric waveguiding regions are preferred in many optical applications.

One example of an optical component that confines electromagnetic energy is a fiber laser. Typically, such lasers include a high-index core that radially confines EM radiation through total internal reflection (TIR). In addition, they include refractive index modulations along their length to axially confine radiation and define a lasing cavity. For example, two Bragg gratings can surround a gain medium and define end reflectors, thereby forming what is called a "distributed Bragg reflector (DBR) laser." Alternatively, the axial modulation can extend throughout the length of the gain medium to form a "distributed feedback (DFB) laser."

One way of thinking about the resonant modes for such cavities is that they correspond to modes that spend a long time in the cavity. In other words, they correspond to modes at frequencies where the group velocity, $v_g = \partial\omega/\partial\beta$, approaches zero (where $\omega(\beta)$ gives the dispersion relation for a mode with angular frequency $\omega$ at a longitudinal wavevector $\beta$). This condition is equivalent to a divergence in the density of states (DOS) as a function of frequency $\omega$.

Photolithographic techniques are typically used to form the axial index modulations in fiber lasers. For example, high-intensity regions of a standing wave illumination pattern can induce photo-refractive changes in index along the length of the fiber.

SUMMARY

The invention features a dielectric structure having a longitudinal axis, which supports an electromagnetic mode having a region where the group velocity passes from negative values to positive values over a range of non-zero longitudinal wavevector (i.e., it has a zero group velocity crossing). The presence of the mode having the zero group velocity crossing is caused by an index modulation perpendicular to the longitudinal axis. In other words, the zero group velocity mode can be present even when the dielectric structure has continuous translation symmetry along its longitudinal axis. Such symmetry is equivalent to the structure having a uniform cross-section. Notably, metallic regions are not necessary to produce the zero group velocity crossing, thus any component incorporating the structure may be all-dielectric, thereby avoiding the optical losses associated with metallic materials.

The dielectric structure may used in a variety of applications. For example, the dielectric structure may be used to define the cavity for a laser. Furthermore, it may define a cavity used to build up optical intensity for nonlinear applications such as optical switching. Moreover, it may be used as a time-delay element. Furthermore, the structure is highly dispersive in the region of the zero group velocity crossing, reflecting the fact that relative changes in the group velocity as a function of frequency are very large at frequencies near the zero group velocity frequency. Thus, the structure may be used for dispersion compensation. Similarly, the presence of the zero group velocity crossing can cause large phase shifts to an incident optical signal when the structure is actively modulated (e.g., electrical or optical modulation) to switch the device away from the region of the zero group velocity crossing. Accordingly, the structure may be used as a modulator.

The position of the zero group velocity crossing can be tuned for a desired end-application through a corresponding selection of the index cross-section. Furthermore, because the structure can have continuous translation symmetry along its longitudinal axis, it can be manufactured through a continuous process such as co-extrusion or drawing or deposition. More generally such symmetry simplifies manufacture because no longitudinal modulation is necessary. Furthermore, because the zero group velocity crossing can be produced in an all-dielectric structure, losses associated with metallic regions can be avoided.

We now summarize different aspects and features of the invention.

In general, in one aspect, the invention features an optical component including a dielectric waveguide extending along a longitudinal axis and having a refractive index cross-section perpendicular to the longitudinal axis. The refractive index cross-section causes the dielectric waveguide to support an electromagnetic (EM) mode having a group velocity that passes from negative values to positive values over a range of non-zero longitudinal wavevectors. For example, the frequency of the mode at the zero group velocity crossing may correspond to a vacuum wavelength in the range of about 350 nm to about 3 microns.

Embodiments of the optical component may include any of the following features.

The cross-section of the dielectric waveguide can include an inner dielectric region and an outer dielectric region surrounding the inner dielectric region. The outer dielectric region substantially confines EM energy of the EM mode within the inner dielectric region and the inner dielectric region includes a higher-index region surrounded by at least one lower-index region. For example, the higher index region in the inner region can be a core including the longitudinal axis of the waveguide.

The outer dielectric region can include a series of concentric dielectric layers. For example, the layers can alternate between a first layer having a first thickness and a first refractive index and a second layer having a second thickness and a second refractive index different from the first refractive index. Furthermore, the concentric layers in the outer region can form a Bragg reflector, and in some cases, they can form an omnidirectional Bragg reflector. Alternatively, the outer dielectric region can be a two-dimensionally periodic structure with a photonic bandgap. In addition to the outer dielectric region, the waveguide may further include further a metal layer surrounding the outer region to further reduce leakage of the EM energy to the surrounding environment.

In some embodiments, the inner dielectric region includes only the higher-index core and the one lower-index region surrounding the core. In other embodiments, the inner dielectric region includes at least two lower-index regions surrounding the core and at least one additional higher-index region separating the lower-index regions. The refractive index of the core may be the same as, or different from, that of the higher-index region separating the lower-index regions. Similarly, the refractive index of the lower-index regions may be the same or different. Furthermore, the core can have a circular cross-section and the higher-index and lower-index regions can be concentric annular regions surrounding the core. Alternatively, the core and concentric regions may have a rectangular or hexagonal cross-section.

Furthermore, the cross-section of the waveguide as a whole may be, for example, circular, hexagonal, or rectangular. Moreover, the waveguide may a uniform cross-section with respect to the longitudinal axis. Also, the longitudinal axis may be straight or it may include a curved portion.

Finally, the optical component may further include a bias source coupled to the dielectric waveguide. During operation the bias source selectively alters the refractive index of a portion of the waveguide to alter the wavevector corresponding to the zero group velocity crossing.

In another aspect, the invention features a laser including: the dielectric waveguide described above, wherein the dielectric waveguide includes a gain medium; and an excitation source coupled to the gain medium. During operation the excitation source causes the gain medium to emit photons at a frequency in the region where the group velocity of the EM mode passes from negative values to positive values.

Embodiments of the laser may include any of the following features.

The dielectric waveguide may include a core aligned with the longitudinal axis and multiple layers surrounding the core. The gain medium may be dispersed within the core. Alternatively, or in addition, the gain medium may be dispersed within one of the layers. The excitation source may be an optical source or an electrical source. The laser may further include a bias source coupled to the dielectric waveguide. During operation the bias source selectively alters the refractive index of a portion of the waveguide to alter the wavevector corresponding to the zero group velocity crossing. The bias source may be, for example, an optical or electrical bias source.

In another aspect, the invention features a nonlinear optical method including: providing the dielectric waveguide described above; coupling an input optical signal into the dielectric waveguide, wherein the input optical signal is at a frequency in the region where the group velocity of the EM mode passes from negative values to positive values; and receiving an output optical signal produced by a nonlinear optical interaction between the input signal and the dielectric waveguide.

In another aspect, the invention features a nonlinear optical switch including: the dielectric waveguide described above; an input channel configured to couple an input optical signal into the dielectric waveguide, wherein the input optical signal is at a frequency in the region where the group velocity of the EM mode passes from negative values to positive values; and an output channel configured to receive an output optical signal produced by a nonlinear optical interaction between the input signal and the dielectric waveguide.

In another aspect, the invention features an optical modulator including: the dielectric waveguide described above; and a bias source coupled to the dielectric waveguide. During operation the bias source selectively alters the refractive index of a portion of the waveguide to alter the region where the group velocity of the EM mode passes from negative values to positive values. For example, the bias source may be an optical or electrical bias source. The alteration of the refractive index may cause the frequency of the zero group velocity crossing to change or it may cause the zero group velocity crossing to disappear.

In another aspect, the invention features a portion of an optical telecommunications network including: an optical transmission line connecting two nodes of the network; and the dielectric waveguide described above coupled to the transmission line between the two nodes, wherein the parameters of the waveguide are selected to offset group velocity dispersion introduced by the optical transmission line over a range of frequencies. The network portion may further include a bias source (e.g., an electrical or optical bias source) coupled to the waveguide. During operation the bias source selectively alters the refractive index of a portion of the waveguide to selectively alter its dispersion.

In another aspect, the invention features a dispersion compensation method including: providing the dielectric waveguide described above; coupling an input optical signal into the waveguide to impart group velocity dispersion to the signal, wherein the input optical signal is at a frequency in the region where the group velocity of the EM mode passes from negative values to positive values; and selecting the amount of group velocity dispersion imparted to the signal based on the parameters of the waveguide. The method may further include applying a bias to the waveguide to change the amount of group velocity dispersion imparted to the signal.

In another aspect, the invention features an optical system including: at least two optical paths coupled at one end, wherein each path is configured to carry an optical signal; and the waveguide described above positioned along one of the paths. During operation the waveguide introduces a time delay to one of the signal when that signal is at a frequency in the region where the group velocity of the EM mode passes from negative values to positives value.

In another aspect, the invention features an optical time delay method including: providing the waveguide described above; and delaying an optical signal by directing it through the waveguide, wherein the signal is at a frequency in the region where the group velocity of the EM mode passes from negative values to positive values.

Other features, objects, and advantages of the invention will be apparent from the following detailed description and drawings, and from the claims.

DESCRIPTION OF DRAWINGS

The invention will now be further described merely by way of example with reference to the accompanying drawings in which.

DETAILED DESCRIPTION

Figure 1:
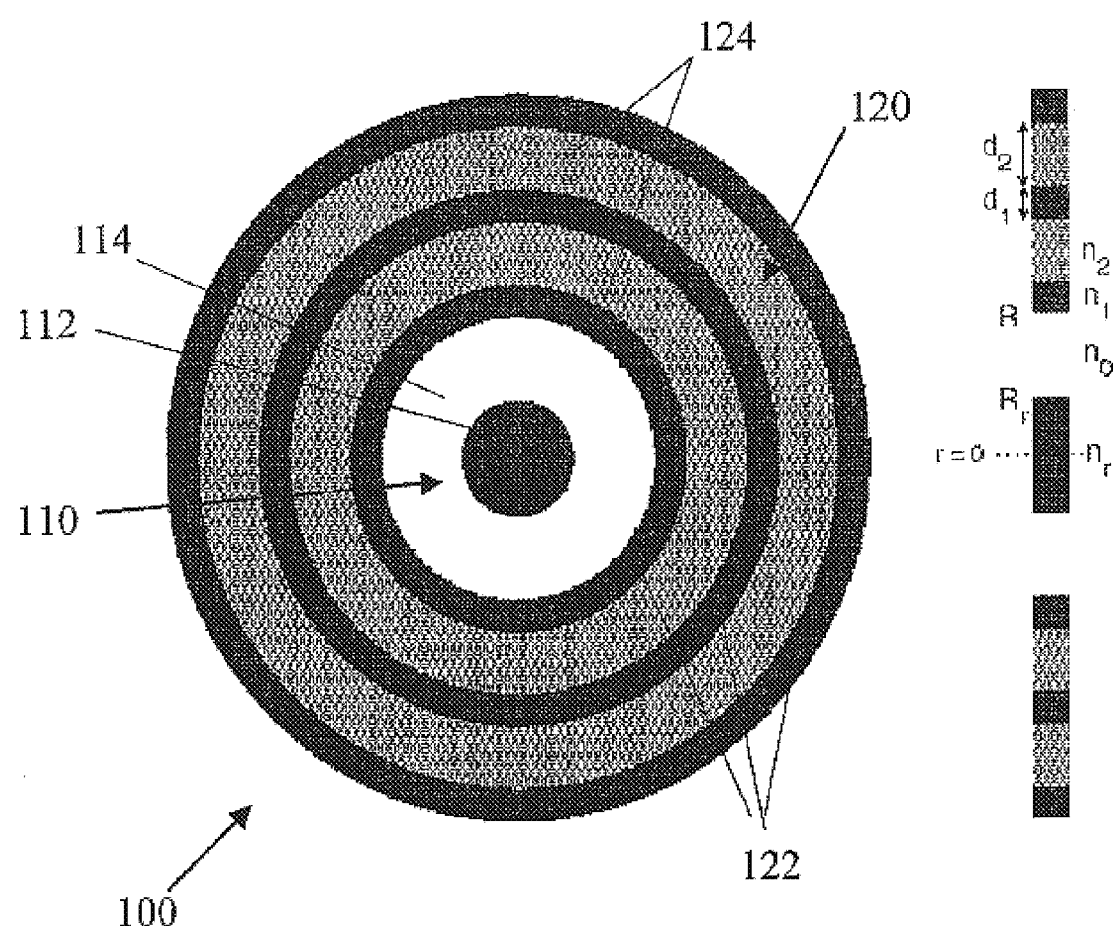
FIG. 1 is a cross-section of a cylindrical waveguide supporting a mode having a zero group velocity point at a non-zero longitudinal wavevector.

The invention relates to a dielectric structure having a longitudinal axis, such as a cylindrical dielectric waveguide 100, whose cross-section is shown in FIG. 1. Applicants have discovered that refractive index variations in the structure can be selected to cause it to support an electromagnetic (EM) mode that has a group velocity that changes sign over a range of non-zero wavevectors for the longitudinal axis.

Referring again to the particular embodiment shown in FIG. 1, waveguide 100 includes an inner region 110 and an outer region 120 surrounding the inner region. The refractive index variation in outer region 120 is selected to cause electromagnetic EM radiation propagating in inner region 110 to be substantially confined therein over at least one range of frequencies.

As shown in FIG. 1, for example, outer region 120 can be formed by an alternating series of concentric dielectric rings 122 and 124 having high ($n_1$) and low ($n_2$) indices of refraction. The thickness of the respective layers is illustrated to the right of the cross-section in FIG. 1. The thickness and refractive index of each ring is selected to form a Bragg reflector similar to that formed in a planar, multilayer dielectric mirror.

Such dielectric mirrors are an example of a one-dimensional photonic crystal, which is a material that has a periodic index variation along one dimension. Photonic crystals that have periodic index variations along additional dimensions are also possible. All photonic crystals form a photonic band gap that prevents EM radiation from propagating in the crystal along certain directions within a range of frequencies, but not for other frequencies above and below that range. The range of frequencies defines the band gap. In some cases, a photonic crystal can define a complete band gap, which prevents EM radiation from propagating in the crystal along any direction and for any polarization within a range of frequencies. Furthermore, a photonic band gap can also be formed with an aperiodic structure. For example, a "chirped" index in which the period of an index variation gradually changes along one or more directions may form a photonic band gap. Photonic Crystals are described in, e.g., John D. Joannopoulos et al., *Photonic Crystals*, Princeton University Press, Princeton 1995.

In the present embodiment, concentric rings 122 and 124 form the Bragg reflector because they have a periodic index variation with respect to the radial axis. One suitable index variation is the "quarter wave condition," where the thickness of each layer is chosen such that $n_1 d_1 = n_2 d_2$, where $d_1$ is the thickness of the high-index rings and $d_2$ is the thickness of the low-index rings. In other embodiments, the quarter-wave condition may be relaxed or omitted entirely.

In the embodiment shown in FIG. 1, only five ring layers are used to form the Bragg reflector. In other embodiments, however, additional layers (e.g., from 10 to 30 layers) may used to enhance the Bragg reflectivity. The appropriate number of layers may also depend on the index contrast between $n_1$ and $n_2$ (i.e., as the contrast increases, fewer layers are necessary), and on the length of the waveguide. To further prevent leakage of EM energy through the outer region and into the surrounding environment, a metal layer (not shown) may surround the outer dielectric region.

Inner region 110 includes a dielectric core 112 and at least one dielectric annular region 114 surrounding the core. In the embodiment of FIG. 1, for example, inner region 110 includes a single annular region 114. As shown in FIG. 1, dielectric core 112 has a radius $R_r$ and index of refraction $n_r$, and annular region 114 extends from $r=R_r$ to $r=R$ and has an index of refraction $n_0$ smaller than that, $n_r$, of core 112. In conjunction with the radial confinement caused by the index variations in outer region 120, the index variations in inner region 110 are selected to produce the electromagnetic mode that has the group velocity that changes sign over the range of non-zero longitudinal wavevectors.

The EM modes supported by a structure can be solved numerically according to Maxwell's equations. Furthermore, for an all-dielectric structure comprising isotropic media, Maxwell's equations can be reduced to:

$$\nabla \times \left( \frac{1}{\varepsilon(r)} \nabla \times H(r) \right) = \left( \frac{\omega^2}{c^2} \right) H(r) \quad (1)$$

$$\nabla \cdot H(r) = \nabla \cdot E(r) = 0 \quad (2)$$

$$E(r) = \left( \frac{-ic}{\omega \varepsilon(r)} \right) \nabla \times H(r), \quad (3)$$

where H and E are the macroscopic magnetic and electric fields, respectively, and $\in$ is the scalar dielectric constant for the structure. To solve for the EM modes of such a structure, one solves the eigenvalue equation given by Eq. 1 (where H is the eigenfunction and $\omega^2/c^2$ is the eigenvalue) subject to the divergence equation, Eq. 2, to give H. Thereafter, one can determine E from H according to Eq. 3.

Often symmetry can be used to simplify the solution. For example, with respect to waveguide 100, we can assume that it has continuous translational symmetry (i.e., a uniform cross-section) along its longitudinal axis, which we shall denote as the z-axis. In practice, however, structure 100 may have small deviations from such uniformity. Moreover, structure 100 will have a finite length. Nonetheless, based on the assumption of a uniform cross-section for some length that is large relative to the waveguide diameter, the EM modes supported by the waveguide can be written schematically as $F(x, y, z) = \exp[i(\beta z - \omega t)] F(x, y)$, where F is any of the electromagnetic field components. The parameter β in the expression for F is the longitudinal wavevector.

Referring again to FIG. 1 and waveguide 100, we consider the following parameters for the various layers: $n_r=3.30n_0$, $n_1=3.00n_0$, $n_2=1.50n_0$, $R_r=0.60a$, $R=1.50a$, $d_1=a/3$, $d_2=2a/3$. Dimensionless quantities are used: all indices of refraction are expressed in terms of $n_0$, and all distances are expressed in terms of a, the length of periodicity of the Bragg reflector (i.e., the combined thickness of each high and low index pair in the outer region).

At β=0, the first bandgap formed by the Bragg reflector in outer region 120 lies between $\omega=0.196(2\pi c/n_0 a)$ and $\omega=0.315(2\pi c/n_0 a)$. Thus, for small wavevectors β, the Bragg reflector substantially confines EM energy within this frequency range to region 110. Solving for the supported EM modes in this range, we find a mode at a frequency of $0.2055(2\pi c/n_0 a)$. In analogy to the nomenclature of modes supported in cylindrical metallic waveguides, we can refer to this mode as the $HE_{11}$ mode. There are also additional modes supported by the waveguide in this frequency range, such as the $TE_{01}$ and $EH_{11}$ modes.

The mode of interest is $HE_{11}$ because we find that it has a point of zero group velocity at a non-zero wavevector. This corresponds to a singularity that gives rise to an additional peak in the density of states (DOS), which, as is described subsequently, can be used as a lasing cavity. The frequency and the group velocity for the $HE_{11}$ mode are plotted as a function of β in FIG. 2. The dependence of the DOS on frequency is also shown in the upper right part of the figure. We see that the frequency of the mode starts decreasing as we move away from β=0. The frequency has a minimum at $\beta \approx 0.07(2\pi/a)$, after which it starts increasing, and the mode turns into a normal mode of the waveguide.

Figure 2:
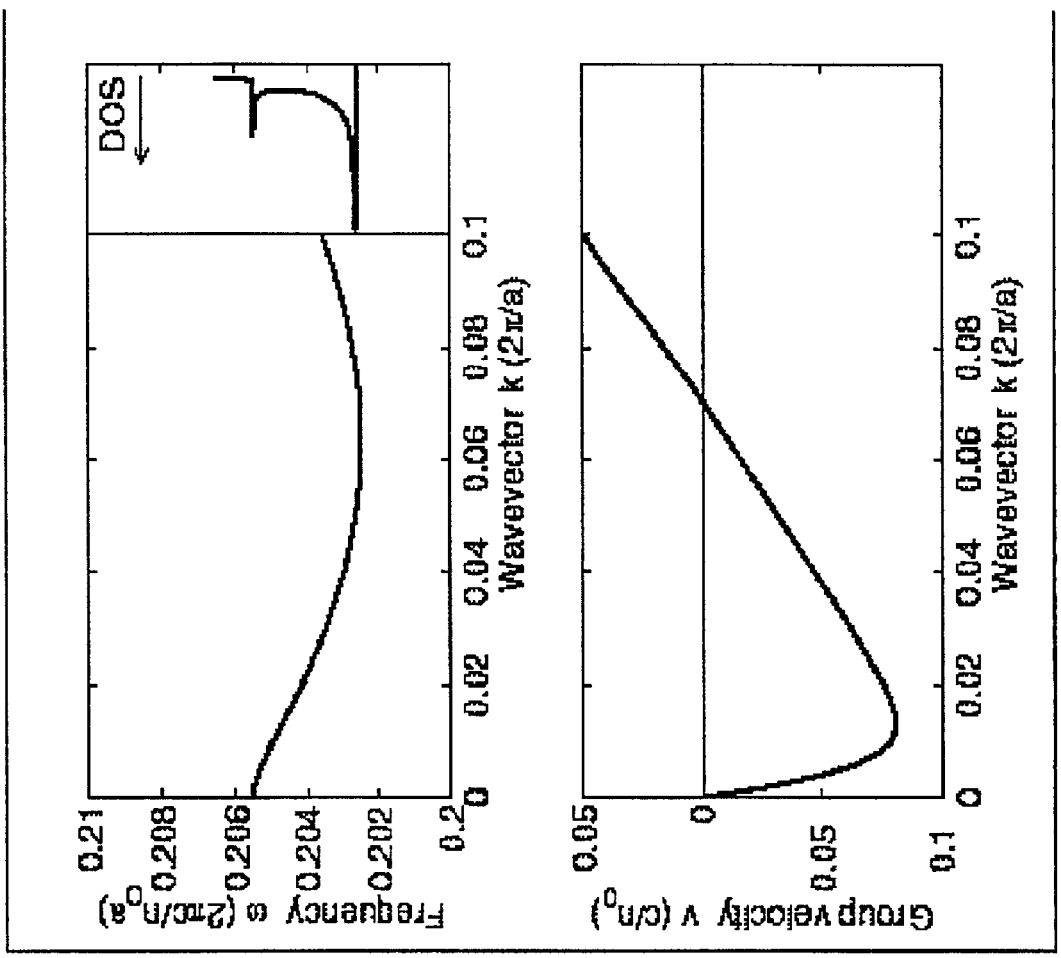
FIG. 2 are plots of the dispersion characteristics of the waveguide of FIG. 1.

In the lower part of FIG. 2 we plot the group velocity of the $HE_{11}$ mode. At β=0, $v_g$ is always zero because of time reversal symmetry. As we move away from β=0 there is a sharp decrease in the group velocity. A minimum $v_g$ of $-0.08(c/n_0)$ is attained at $\beta \approx 0.01(2\pi/a)$. Following this minimum, the group velocity increases slowly and reaches 0 again at $\beta \approx 0.07(2\pi/a)$. In the region of negative group velocity, the energy transport is in a direction opposite to that given by the wavevector. The two points of zero group velocity produce two peaks in the DOS associated with this mode. One comes from the "usual" singularity at (β, ω)=(0, 0.2055), and a second one from the additional singularity at (β, ω)=(0.07, 0.2026).

In contrast to the waveguide of FIG. 1, the dispersion curve ω(β) for a typical cylindrical waveguide starts at β=0 with zero group velocity $v_g=(d\omega/d\beta)_{\beta=0}=0$, and thereafter ω(β) increases monotonically. Index modulations introduced along the longitudinal axis of such a waveguide can give rise to a zero group velocity or an associated resonant cavity. Such prior art structures include the DBR and DFB lasers described earlier. On the other hand, the waveguide of FIG. 1 has a uniform cross-section and nonetheless exhibits the zero group velocity at a non-zero longitudinal wavevector. Accordingly, the zero group velocity cannot be attributed to the conventional feedback mechanisms found in DFB and DBR lasers. In other words, the mode having the zero group velocity crossing is caused by the index variations in the structure orthogonal to the longitudinal axis.

Notably, the location of the zero group velocity point can be tuned to achieve a desired value for the corresponding longitudinal wavevector (and its corresponding frequency) by changing the parameters of the waveguide (such as the ratios $n_r/n_0$ and $R_r/R$). Of course, some changes cause the zero group velocity point (at the non-zero longitudinal wavevector) to disappear altogether. For example, if the central rod 112 is removed and replaced with a dielectric of index $n_0$ to match that of annular ring 114, the effect disappears. Accordingly, the effect is related to the presence of a high-index central core. Furthermore, calculations for the structure of FIG. 1 in which there is only single annular ring 114 in inner region 110 indicate that the effect requires some minimum value of the ratio $n_r/n_0$. The precise value of the minimum is complicated by the parameters of the Bragg reflector formed in outer region 120. To estimate the minimum, we replace the Bragg reflector by a metallic cylinder of radius R. We then find an absolute minimum of $(n_r/n_0)_{min} \approx 3.0$, which is obtained for $R_r/R \approx 0.6$.

Figure 3:
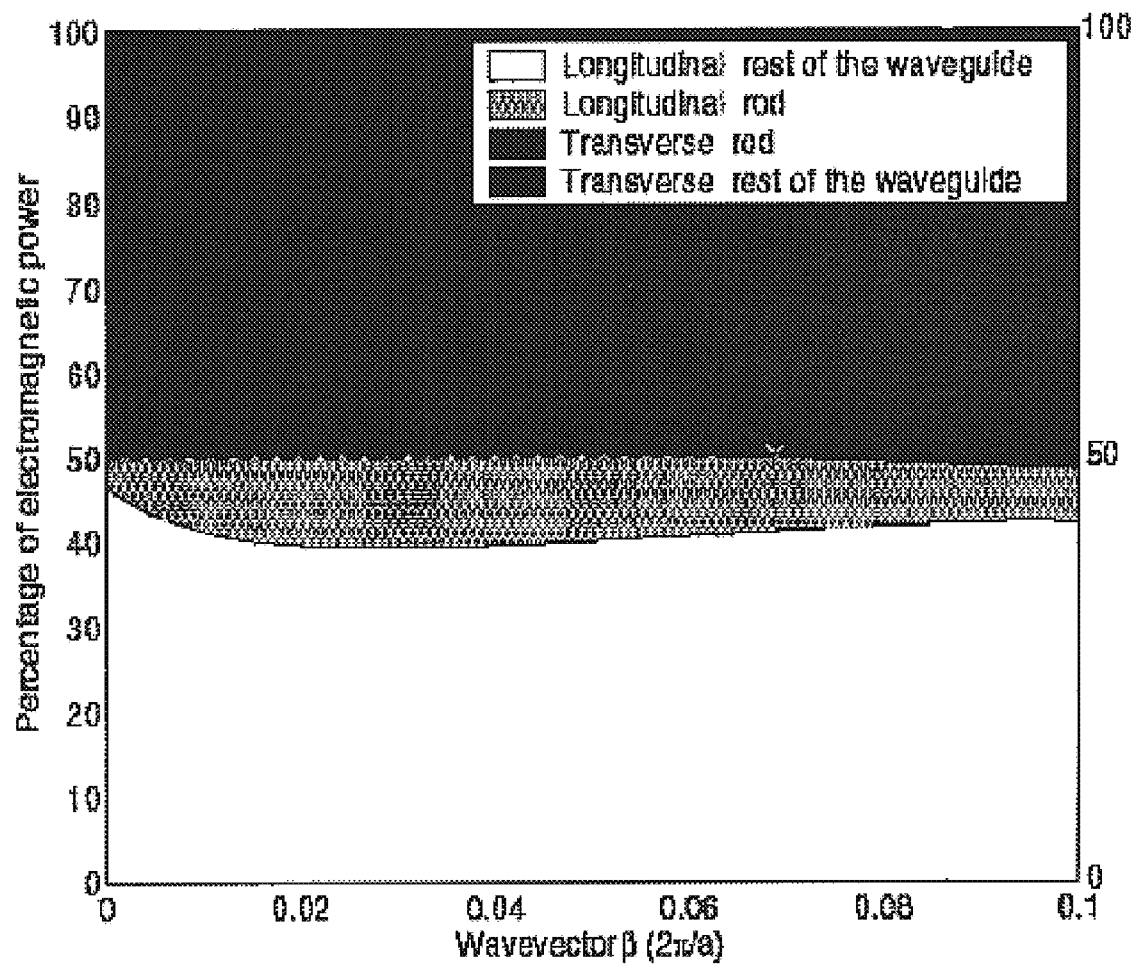
FIG. 3 is an area graph of the energy distribution for the zero group velocity mode of the waveguide of FIG. 1.

To better understand the role of the central core in obtaining the negative group velocity, one may consider the following formula that relates group velocity and energy distribution for a uniform waveguide:

$$v_g = \omega/\beta \cdot (f_T - f_L) \qquad (4)$$

where $f_T$ is the ratio of the electromagnetic energy in the transverse components to the total energy in the waveguide, and $f_L$ is the equivalent quantity for the longitudinal components. Accordingly, $f_T + f_L = 1$. The formula shows that negative group velocity requires more energy to be in the longitudinal components than in the transverse components, i.e., $f_L > 50\%$ and $f_T < 50\%$. FIG. 3 shows an area plot of the energy distribution in four categories: i) longitudinal energy in the waveguide except for the central core; ii) longitudinal energy in the core; iii) transverse energy in the core; and iv) transverse energy in the rest of the waveguide. All four quantities are expressed as fractions of the total energy in the waveguide. The sum of the first two quantities is equal to $f_L$, the longitudinal energy. One sees that $f_L$ starts at 50% at β=0, then it goes above the 50% line (the dashed line). At $\beta \approx 0.07(2\pi/a)$, $f_L$ is equal to 50% again, which means that the group velocity is zero at this point. Looking now at the longitudinal energy vs. transverse energy in the central dielectric core ($2^{nd}$ and $3^{rd}$ quantities in the area plot), one sees that the presence of the core favors the longitudinal components, therefore favoring the appearance of a region of negative group velocity.

Figure 4:
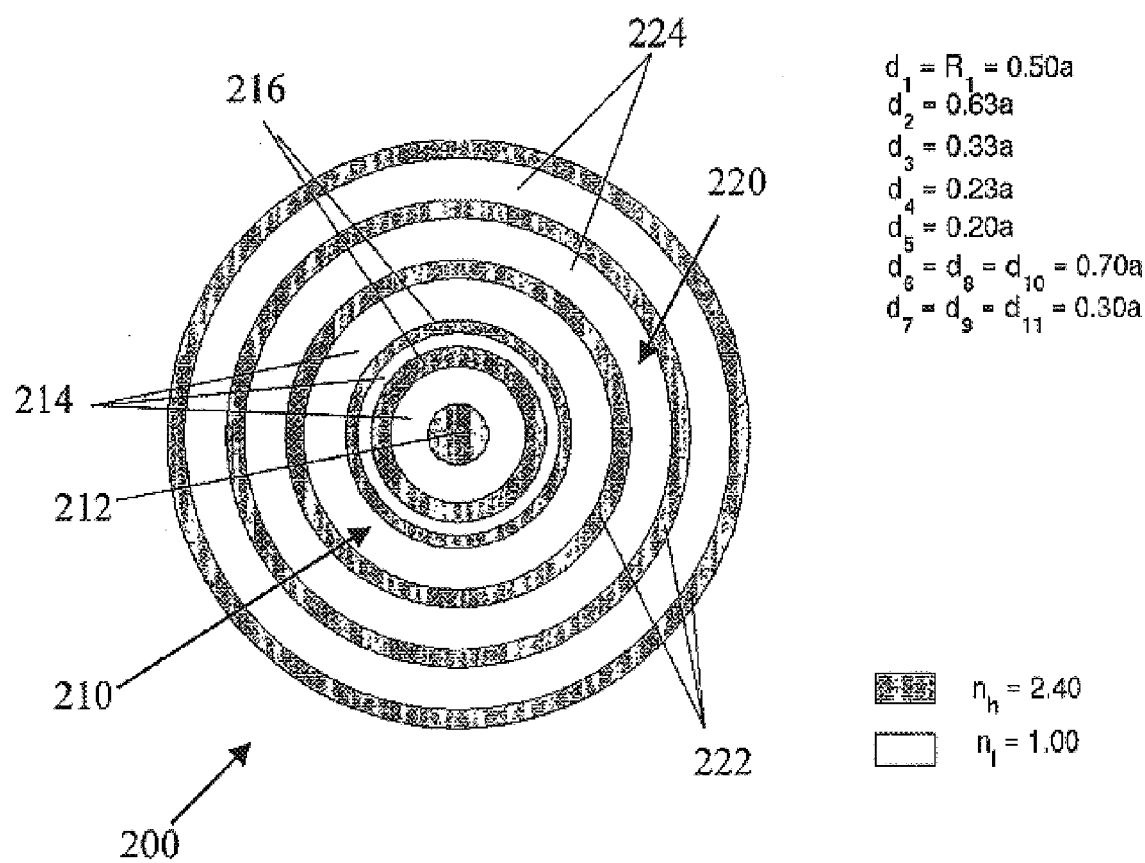
FIG. 4 is a cross-section of another cylindrical waveguide supporting a mode having a zero group velocity point at a non-zero longitudinal wavevector.

Although we observe a minimum value of $(n_r/n_0)_{min} \approx 3.1$ for the embodiment of FIG. 1 in which there is only a single annular region 114, the contrast ratio can be reduced below this minimum by introducing additional annular regions to inner region 110. For example, FIG. 4 shows another embodiment of a dielectric waveguide that supports a mode having a zero group velocity at a non-zero longitudinal wavevector, in which the contrast ratio is 2.40. In particular, FIG. 4 shows the cross-section of a dielectric cylindrical waveguide 200 having an inner region 210 formed by a high-index core 212 and five concentric annular regions, and an outer region 220 formed by five additional concentric annular regions that form a Bragg reflector. The five concentric annular regions in inner region 210 include three low-index regions 214 alternating with two high-index regions 216. Similarly, the five concentric annular regions in outer region 220 include three high-index regions 222 alternating with two low-index regions 224. The particular thickness and index parameters are given as follows, where the different regions (including the core) are numbered from center towards the outside (e.g., d1 is the radius of the central core): $d_1=R_1=0.50a$; $d_2=0.63a$; $d_3=0.33a$; $d_4=0.23a$; $d_5=0.20a$; $d_6=d_8=d_{10}=0.70a$; $d_7=d_9=d_{11}=0.30a$; $n_1=n_3=n_5=n_7=n_9=n_{11}=2.40n_0$; and $n_2=n_4=n_6=n_8=n_{10}=n_0$.

The energy of the mode is concentrated mostly in the first 6 layers. The 5 outer layers provide radial confinement and do not tend to influence the dispersion properties of the mode. Accordingly, we can think of the structure as being made of two parts with different functions: the inner region that produces the zero-group velocity point of the mode, and the outer region that radially confines the mode and suppresses radiative loss. For simplicity, the embodiment of FIG. 4 includes only have 5 layers in the outer region to provide confinement. In other embodiments, the number of layers in the outer region may differ depending on what degree of radiative loss is acceptable. Furthermore, as described above, the waveguide may further include a metal layer surrounding the outer region to further suppress radiative loss.

Figure 5:
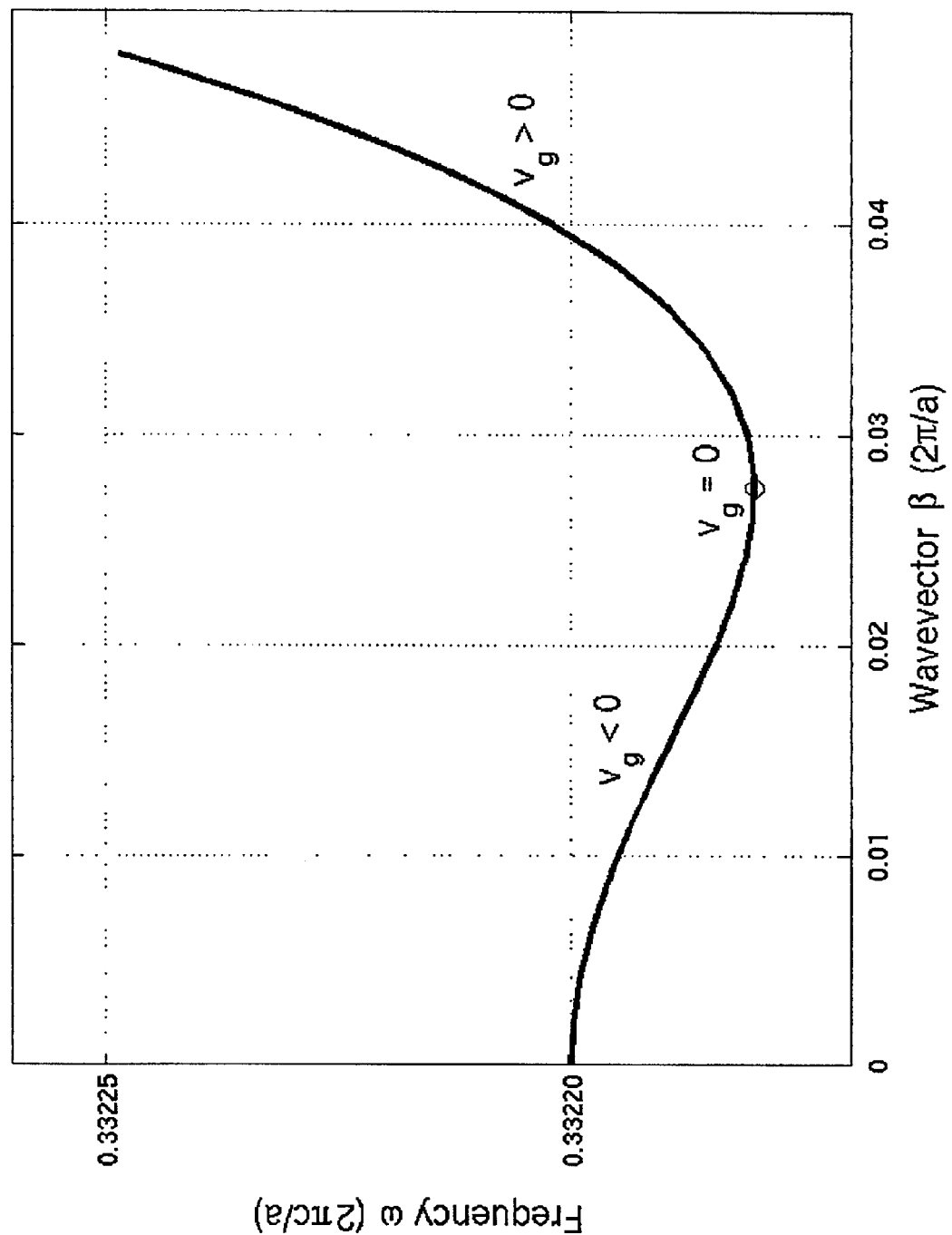
FIG. 5 is a plot of the dispersion characteristics of the waveguide of FIG. 4.

FIG. 5 shows the dispersion curve from the zero group velocity crossing of waveguide 200. The zero group velocity crossing occurs at $(\beta,\omega)=(0.0275, 0.33218)$, where the wavevector $\beta$ is in units of $2\pi/n_0 a$ and the frequency $\omega$ is in units of $2\pi c/n_0 a$.

The results relating to the waveguides 100 and 200 show that the location of the zero group velocity point scales with the values of a and the low index $n_0$. Moreover, in further embodiments, the parameters for the structures of FIGS. 1 and 4 can be modified so that higher-order modes exhibit the zero group velocity crossing. For example, the crossing can be made to occur in higher-order modes, such as $HE_{21}$, $HE_{31}$, etc. Generally, this requires an increase in the radii of the various layers such that the higher order modes can be brought into the bandgap of the Bragg reflector defined by the outer region.

Additional embodiments of a waveguide supporting a mode having a zero group velocity for a non-zero longitudinal wavevector may differ from the cross-sectional profiles of waveguides 100 and 200. In particular, the values for the refractive index and thickness of each layer may scale differently from those of waveguides 100 and 200. Furthermore, in additional embodiments, the high-index core may include a small interior low-index region. For example, it may be desirable for the core to include a small hollow region through which an electrode might pass. Moreover, additional embodiments need not have the radial symmetry associated present in waveguides 100 and 200. Such symmetry simplifies the numerical calculation of the waveguide modes, but is not necessary to achieve the zero group velocity effect. For example, the cross-section of the inner regions (or the waveguide as a whole) need not be cylindrical, but rectangular or hexagonal cross-sections are also possible.

To optimize the parameters for such additional embodiments of the waveguide, mode structures may be determined iteratively using Eqs. 1–3 (or more generally, Maxwell's equations themselves) to determine an index variation orthogonal to the longitudinal axis that produce the mode having the zero group velocity crossing. Typically, such embodiments will include: i) an outer region that substantially confines EM energy to an inner region surrounding the longitudinal axis; and ii) an inner region including a relatively low-index region surrounding a relatively high-index region such as a central core. Furthermore, additional embodiments need not have strict translation symmetry with respect to the longitudinal axis (i.e., the cross-section with respect to the longitudinal axis need not be strictly uniform). In such cases, however, the presence of the zero-group velocity mode is caused by the index variations in the structure orthogonal to the longitudinal axis, and not by any spurious or secondary non-uniformity along the longitudinal axis (unlike, for example, the longitudinal index variations in a DBR or DFB cavity).

Moreover, in additional embodiments of the invention, the waveguides need not have a straight longitudinal axis, but rather, the longitudinal axis may bend. This is possible when the outer region provides sufficient confinement in the region of the bend. The use of an omnidirectional reflector for the outer region may facilitate such confinement. An omnidirectional reflector is one that is reflective for all (or substantially all) incident angles and any incident polarization. The parameters of a Bragg reflector can be adjusted to exhibit this property, as described in: commonly-owned U.S. Pat. No. 6,130,780; commonly-owned U.S. patent application Ser. No. 09/551,908 entitled "All-Dielectric Coaxial Waveguide" and related PCT Publication WO 00/65386; and commonly owned U.S. Application 09/418,344 entitled "Omnidirectional Multilayer Device for Optical Waveguiding" and related PCT Publication WO 00/22466. The contents of these documents are incorporated herein by reference. Furthermore, rather than the Bragg reflector, which is an example of a one-dimensional photonic crystal, the outer region may be selected to form a two-dimensional photonic crystal (e.g., such as a rectangular or hexagonal lattice of holes or dielectric rods). See, for example, R. F. Cregan et al., Science 285:1537-1539, 1999.

The multilayer waveguides described above may be fabricated using multilayer co-drawing techniques, co-extrusion techniques, or deposition techniques. Suitable high-index materials may include chalcogenide glasses such as binary and ternary glass systems, heavy metal oxide glasses, amorphous alloys, and high-index doped polymers. Suitable low-index materials may include oxide glasses such as borosilicate glasses, halide glasses, and poymers such as polystyrene. In addition, low-index regions may be fabricated by using hollow structural support materials, such as silica spheres or hollow fibers, to separate high-index layers.

To efficiently couple EM energy into, or out of, the waveguides described above, one can adiabatically vary the properties of the zero group velocity waveguide. For example, one can change (e.g., taper) the radial dimensions of the waveguide, or slowly change the index of refraction of one or several of the layers. The effect of such adiabatic changes is the same as changing the frequency of operation of the waveguide from one section to another. Thus, the middle section could have parameters that correspond to operating at the zero group velocity frequency, while the end sections could have parameters that give a larger value for the group velocity and thus a more efficient coupling to a different waveguide.

Furthermore, the properties of the waveguides described above may be dynamically adjusted by using a bias source that selectively alters the refractive index of a portion of the waveguide. For example, the bias source may be an optical or electrical source that interacts with material in the waveguide through a Kerr or Pockels effect. The refractive index change produces a change in the location of the zero group velocity crossing. Typically, the refractive index change produces a proportionate change in the frequency of the zero group velocity crossing. Because the group velocity is small, however, even a small refractive index change produces a large change in the non-zero longitudinal wavevector corresponding to the zero group velocity crossing. Thus, a small bias can significantly change the spatial properties of the zero group velocity mode. Accordingly, such a bias can be used to dynamically affect the coupling efficiency into, and out of, the zero group velocity waveguides because the coupling depends on spatial phase matching with the zero group velocity mode. This effect can be used in any of the applications described below.

The presence of the zero group velocity point in the waveguides described above make them useful for a variety of applications. One such application is that the waveguide can form the cavity for a laser. Typically, lasing can be explained in terms of a feedback mechanism in which emitted photons are multiply reflected back through a gain medium to produce further amplification. The feedback can be localized, as in Fabry-Perot cavities, or distributed, as in the DFB laser. In the case of the waveguides of the present invention, however, emitted photons stay in the active medium because the group velocity is zero.

Figure 6:
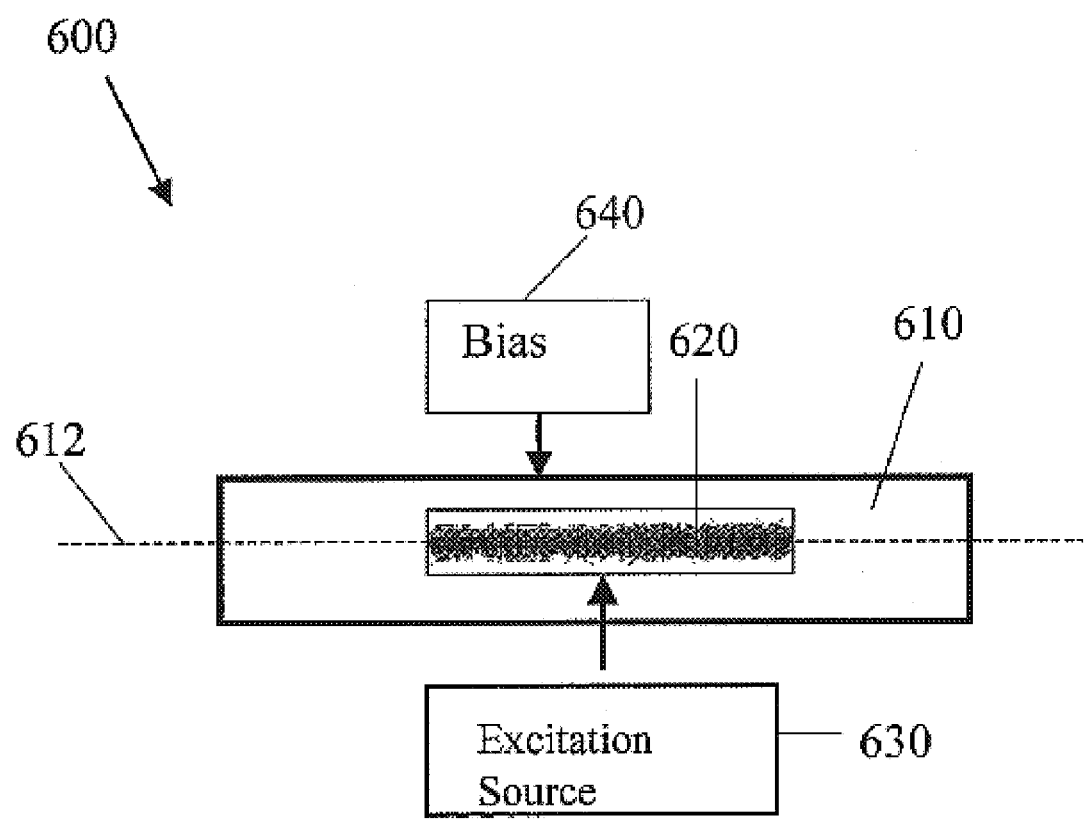
FIG. 6 is a schematic diagram of a laser based on a waveguide supporting a mode having a zero group velocity point at a non-zero longitudinal wavevector.

FIG. 6 shows a schematic diagram of a laser 600 according to the present invention. Laser 600 includes a waveguide 610 having a longitudinal axis 612, a gain medium 620 supported within the waveguide, and an excitation source 630. Waveguide 610 is similar to that described earlier in that it has an index variation orthogonal to its longitudinal axis that causes it to support an EM mode having the zero group velocity crossing. During operation, excitation source 630 causes gain medium 620 to emit photons at a frequency at or near the frequency corresponding the zero group velocity crossing. As a result, the emitted photons travel through the waveguide very slowly and stimulate further emission by the gain medium and thereby cause lasing. Gain medium 620 may be one or more of the dielectric regions that form the inner region of the waveguide, or it may be doped into one or more of such regions. For example, the gain medium can be a doped rare earth material such as in a Erbium-doped fiber, Erbium-doped fluoride fiber, or Praseodymium doped fiber, it can be a semiconductor, or it can be a chromophore such as a dye molecule. Excitation source 630 may produce an optical excitation (e.g., flashlamp, laser, diode array, etc.) or an electrical excitation (e.g., a voltage bias, current, etc.) depending on the particular gain medium. When an optical excitation is used, either side pumping or axial pumping may be used depending on the transmission properties of the waveguide at the pump frequencies. Laser 600 may further include a bias source 640 to dynamically alter the location of the zero group velocity crossing. During operation, bias source 640 (e.g., an optical or electrical source) selectively causes a change in the refractive index of a portion of the waveguide. As described above, such a change typically causes a proportionate change in the frequency of the zero group velocity crossing, and a much larger change in the longitudinal wavevector of the zero group velocity crossing. Bias source 640 can therefore be used to selectively adjust the electromagnetic coupling efficiency into, and out of, waveguide 610. For example, bias source 640 can be used to modulate the output of laser 600.

Figure 7:
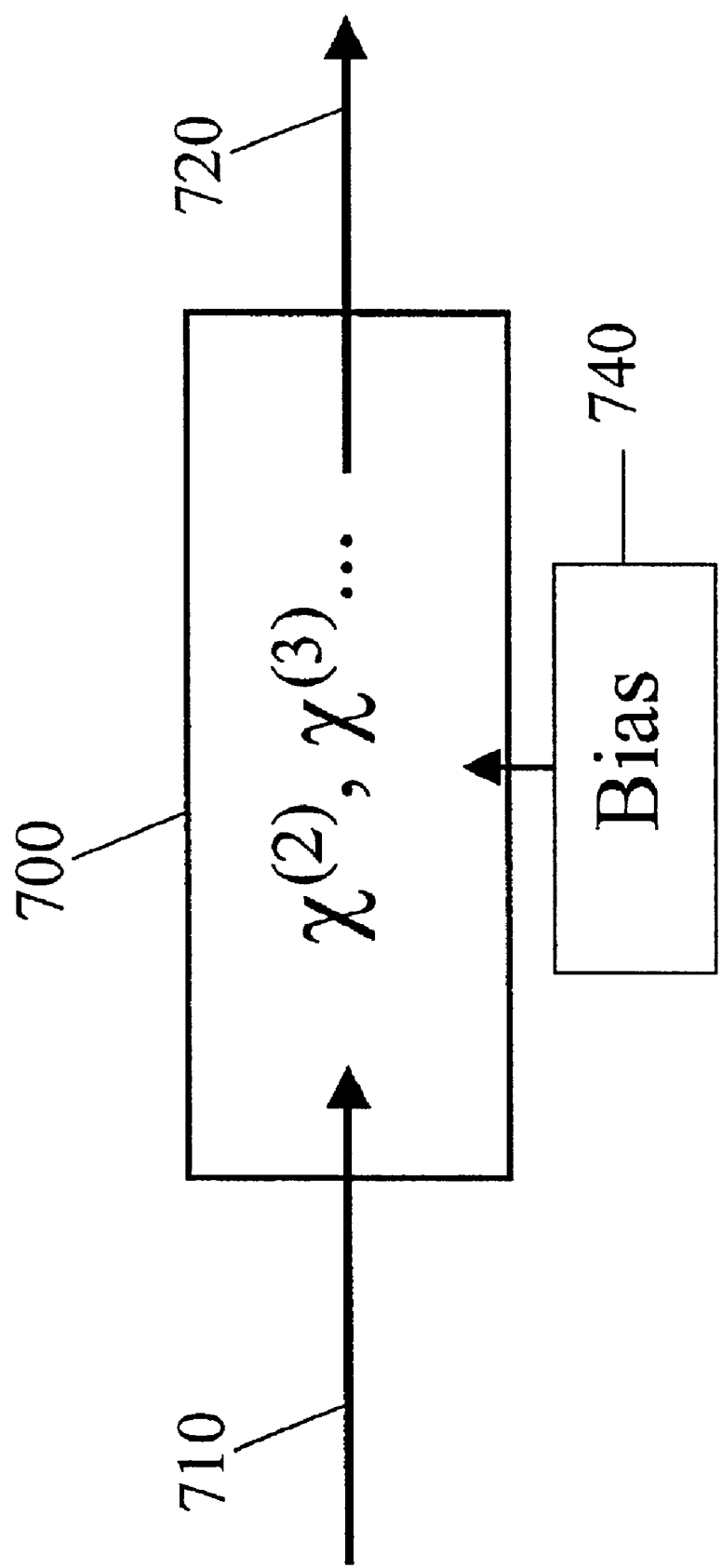
FIG. 7 is a schematic diagram of a nonlinear optical module based on a waveguide supporting a mode having a zero group velocity point at a non-zero longitudinal wavevector.

In another application, the waveguide structure can be used to enhance nonlinear optical effects because the region of zero group velocity effectively produces an axial confinement that build-ups optical intensity. In other words, optical energy stays in the structure a long time because the group velocity is small. The resulting increase in optical intensity can enhance nonlinear optical effects such as self-phase modulation or harmonic conversion. Referring to FIG. 7, a waveguide 700 having the zero group velocity crossing receives an input optical signal 710 at a frequency in the range of the zero group velocity crossing. Because the signal travels slowly within the waveguide, its intensity builds up, and if its initial intensity is sufficiently large, it interacts nonlinearly with material in the waveguide. To better facilitate the effect, the waveguide may be doped with a material known to have a large nonlinear optical coefficients ($\chi^{(2)}$, $\chi^{(3)}$, etc.). Representative nonlinear interactions include, for example, self-phase modulation (SPM), where the refractive index becomes intensity-dependent, and harmonic conversion, where EM energy at the input frequency is converted into EM energy at a harmonic frequency. After propagating through waveguide 700, the EM energy emerges as output optical signal 720. Because of the passage through the waveguide, the output signal 720 will have one or more properties (e.g., phase, amplitude, frequency) that varies nonlinearly as a function of the intensity of input signal 710.

In further embodiments, it is also possible to switch the nonlinear effect on and off by dynamically adjusting the properties of waveguide 700. For example, a bias source 740 may be used to adjust the refractive index of a constituent of waveguide 700. When the DC source is turned on, for example, the frequency of the zero group velocity crossing may be at a first location corresponding to the frequency of input signal 710. On the other hand, when the DC source is turned off, the frequency of the zero group velocity crossing may be at a location different from that of the input signal (or the zero group velocity mode may no longer be present), in which case the energy build up in waveguide 700 no longer occurs. Other permutations are also possible with respect to the bias source settings. Alternatively, one can exploit the relatively large change in the wavevector corresponding to the zero group velocity crossing that is induced by the bias, as described above. The bias source may produce an optical bias signal, which, for example, can modify the constituent through the Kerr effect, or it may produce an electrical bias signal, which, for example, can modify the constituent through the Pockel's effect.

Figure 8:
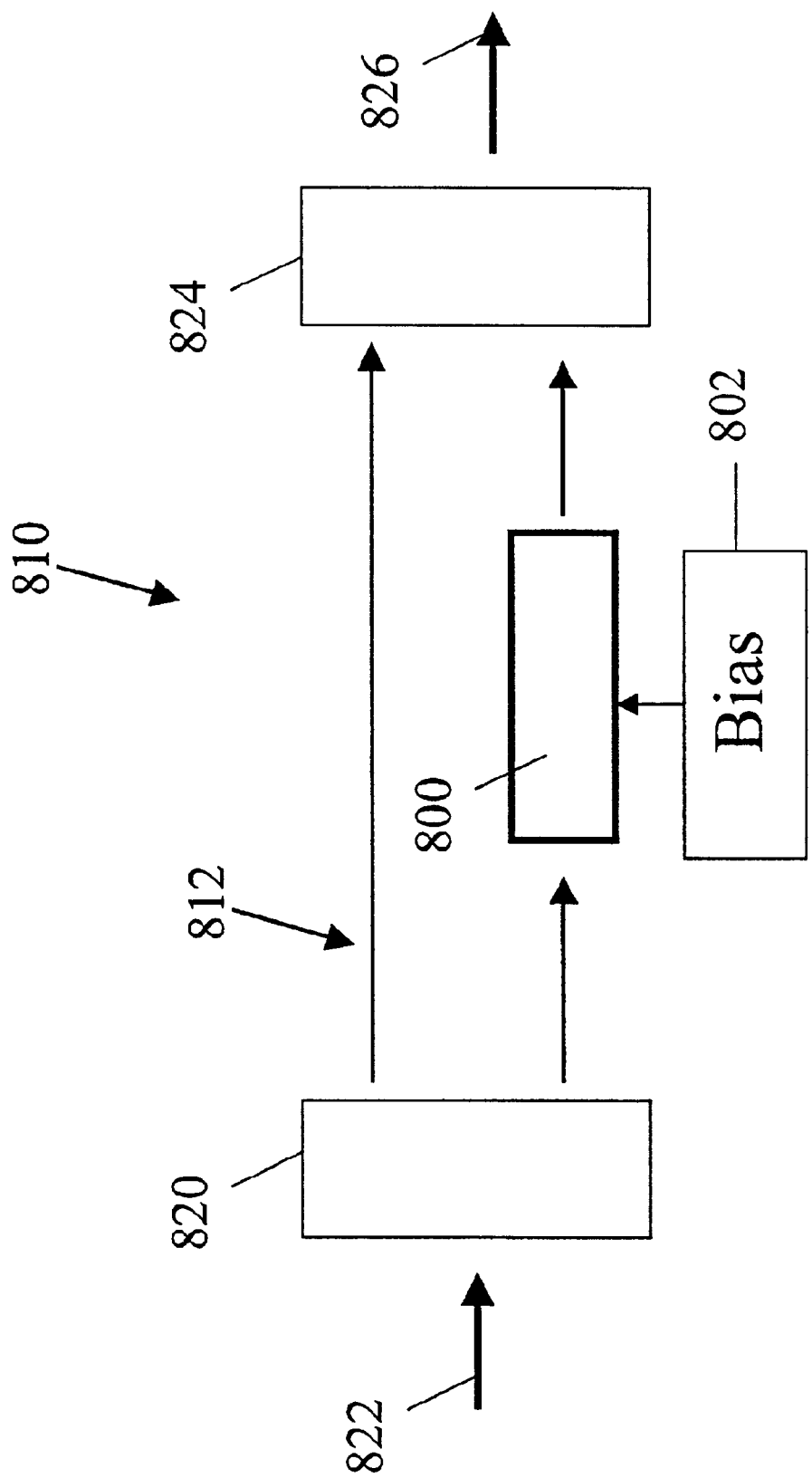
FIG. 8 is a schematic diagram of an amplitude modulator based on a waveguide supporting a mode having a zero group velocity point at a non-zero longitudinal wavevector.

Embodiments of the invention may include such switching applications even when the nonlinear effect is not present or is small. For example, FIG. 8 shows a waveguide 800 having the zero group velocity point being used in one leg of a Mach-Zehnder interferometer 812 to form an amplitude modulator 810. In particular, a splitter 820 separates an input signal 822 into two components that travel different legs of the interferometer. One leg includes the waveguide 800, which is coupled to a bias source 802. The bias source causes the waveguide to impart a phase shift to the component traveling there through. Notably, the phase shift can be very large when the bias shifts the frequency of the zero group velocity point to or from that of input signal. A second splitter 824 recombines the two components to produce an output signal 826, whose intensity will depend on the phase shift imparted by waveguide 800. In additional embodiments, waveguide 800 and bias source 802 can be used on there own as a phase modulator. As in the nonlinear module of FIG. 7, the bias source may produce an optical or electrical bias signal.

In another application, the waveguide having the zero group velocity point may be used as a dispersion compensating element. Group velocity dispersion (GVD) relates to the frequency dependence of the group velocity and is defined as:

$$GVD = -\frac{2\pi c}{\lambda^2}\frac{\partial^2 \beta}{\partial^2 \omega} = \frac{\omega^2}{ca}\frac{1}{v_g^3}\frac{\partial v_g}{\partial \beta} \quad (4)$$

GVD typically includes contributions from the frequency dependence of waveguide supported modes (waveguide dispersion) and chromatic dispersion in materials (material dispersion). Such dispersion causes pulse spreading in optical communications, especially when, e.g., signals propagate over large distances of fiber. The dielectric structures described herein can be tuned to produce a large, desired dispersion at a selected frequency. In particular, as one approaches the zero group velocity point, the waveguide dispersion becomes infinite. Referring to Eq. 4, it is clear that dispersion is very large near the zero group velocity crossing because of the $1/v_g^3$ term. This follows from the fact that as the group velocity approaches zero, relative changes in the group velocity as a function of frequency become very large. Furthermore, referring to Eq. 4, one sees that the dispersion will be negative to the left of the crossing (smaller $\beta$), and positive to the right because $v_g$ changes sign, whereas $$\frac{\partial v_g}{\partial \beta}$$

is relatively constant at the crossing.

An important parameter for a dispersion compensator is the ratio between dispersion and loss. This is called the figure of merit (FOM) of the dispersion compensator. Loss is proportional to $1/v_g$ so it is also very large near the zero group velocity crossing. Nonetheless, the divergence in the dispersion goes as $1/v_g^3$, so the figure of merit is proportional to $1/v_g^2$ and can be very large near the zero group velocity crossing.

Figure 9:
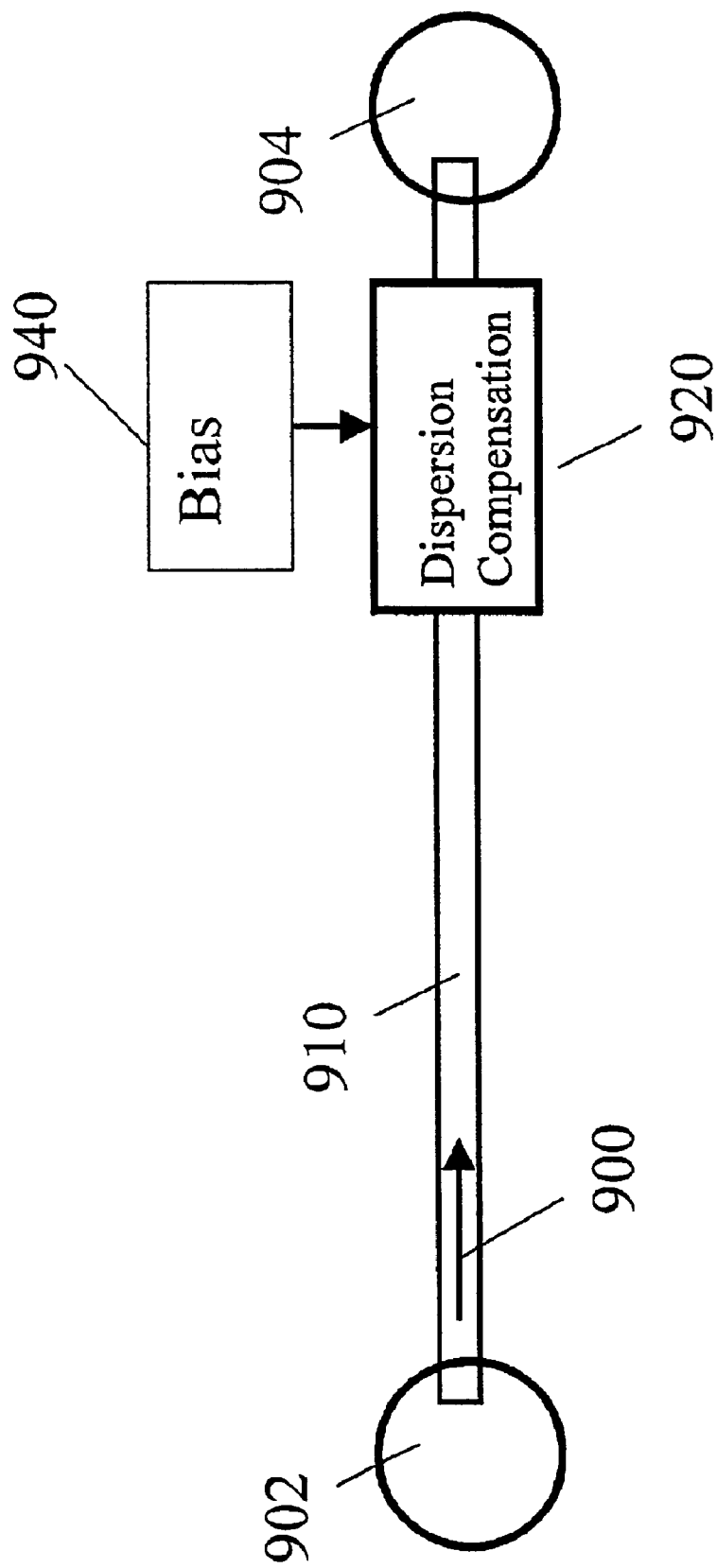
FIG. 9 is a schematic diagram of dispersion compensation based on a waveguide supporting a mode having a zero group velocity point at a non-zero longitudinal wavevector.

This application is illustrated schematically in FIG. 9. An optical signal 900 is transmitted between two nodes 902 and 904 of a telecommunications network along an optical transmission line 910 (e.g., an optical fiber) that introduces dispersion to signal 900. The optical transmission line may also direct the signal through additional components that introduce dispersion. A waveguide 920 having a zero group velocity point is introduced into the optical transmission line somewhere between the two nodes. The parameters of the waveguide are selected to impart an opposite dispersion to that imparted by the other components and the transmission line itself. As a result, pulse broadening between the two nodes can be reduced. When the signal has a frequency in the range of the zero group velocity point of waveguide 920, the dispersion produced by waveguide 920 is very large and thus the compensation can be achieved over a relatively short length of the waveguide. Moreover, one can impart either negative or positive dispersion by coupling the incoming signal to wavevectors that are either smaller or larger than the wavevector corresponding to the zero group velocity crossing. As described in other applications above, the dispersion compensator may further include a bias source 940 to dynamically alter the location of the wavevector corresponding to the zero group velocity crossing, and thereby alter the sign and/or magnitude of the dispersion imparted to signal 900.

Figure 10:
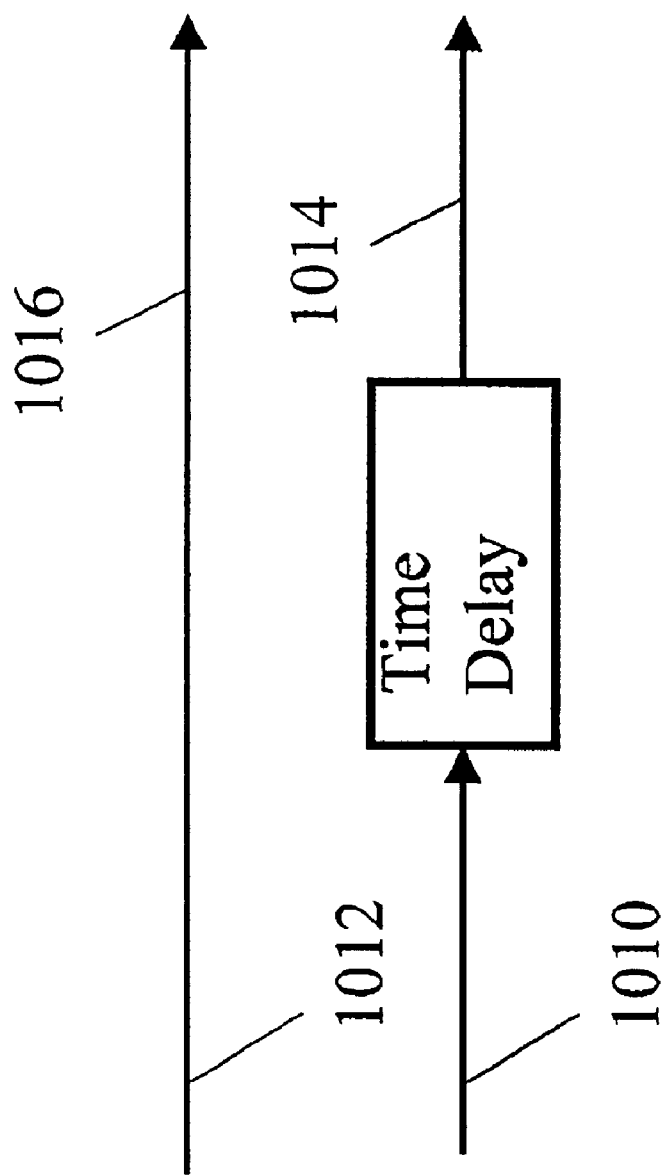
FIG. 10 is a schematic diagram of a time-delay element based on a waveguide supporting a mode having a zero group velocity point at a non-zero longitudinal wavevector.

In another application, the zero group velocity waveguide can be used as a time delay element. For example, FIG. 10 shows an optical system in which two optical signals 1010 and 1012 propagate along different paths 1014 and 1016. The two paths may be derived from a common source or may connect to a common target. One of the paths (e.g., path 1014) includes a waveguide 1030 having a zero group velocity crossing as described above. The zero group velocity crossing is at frequency at or near that of signal 1010. As a result, signal 1010 travels slowly through waveguide 1030 and is delayed relative to signal 1012. Such a delay may be useful, for example, in radio frequency signal processing applications where low frequency EM signals (e.g., radio frequencies) are carried on such optical signals and one is trying to introduce a phase delay between the respective low frequency signals prior to their recombination. For example, the delay can be used in a beam-steering antennae where the signals are carried from a synchronized source to different antennae in a phased-antenna array or vice versa.

A number of embodiments of the invention have been described. Nevertheless, it will be understood that various modifications may be made without departing from the spirit and scope of the invention. Accordingly, other embodiments are within the scope of the following claims.

What is claimed is:

1. An optical component comprising:
   a dielectric waveguide extending along a longitudinal axis and having a refractive index cross-section perpendicular to the longitudinal axis, the refractive index cross-section causing the dielectric waveguide to support an electromagnetic (EM) mode having a group velocity that passes from negative values to positive values over a range of non-zero longitudinal wavevectors.

2. The optical component of claim 1, wherein the cross-section of the dielectric waveguide comprises an inner dielectric region and an outer dielectric region surrounding the inner dielectric region, wherein the outer dielectric region substantially confines EM energy of the EM mode within the inner dielectric region and the inner dielectric region includes a higher-index region surrounded by at least one lower-index region.

3. The optical component of claim 2, wherein the higher index region in the inner region is a core including the longitudinal axis of the waveguide.

4. The optical component of claim 2, wherein the outer dielectric region comprises a series of concentric dielectric layers.

5. The optical component of claim 4, wherein the concentric layers alternate between a first layer having a first thickness and a first refractive index and a second layer having a second thickness and a second refractive index different from the first refractive index.

6. The optical component of claim 5, wherein the concentric layers in the outer region form a Bragg reflector.

7. The optical component of claim 6, wherein the Bragg reflector is an omnidirectional Bragg reflector.

8. The optical component of claim 3, wherein the inner dielectric region consists of the core and the one lower-index region surrounding the core.

9. The optical component of claim 3, wherein the inner dielectric region comprises at least two lower-index regions surrounding the core and at least one additional higher-index region separating the lower-index regions.

10. The optical component of claim 9, wherein the refractive index of the core is the same as that of the higher-index region separating the lower-index regions.

11. The optical component of claim 9, wherein the refractive index of the lower-index regions are the same.

12. The optical component of claim 9, wherein the thickness of at least one of the lower-index regions differs from that of at least one other of the lower-index regions.

13. The optical component of claim 9, wherein the core has a circular cross-section and the higher-index and lower-index regions are concentric annular regions surrounding the core.

14. The optical component of claim 1, wherein the cross-section is circular.

15. The optical component of claim 1, wherein the waveguide has a uniform cross-section with respect to the longitudinal axis.

16. The optical component of claim 1, wherein the longitudinal axis is straight.

17. The optical component of claim 1, wherein the frequency of the mode at the zero group velocity crossing corresponds to a vacuum wavelength in the range of about 350 nm to about 3 microns.

18. The optical component of claim 2, wherein the outer dielectric region is a two-dimensionally periodic structure with a photonic bandgap.

19. The optical component of claim 9, wherein the refractive index of the core is different from that of the higher-index region separating the lower-index regions.

20. The optical component of claim 9, wherein the refractive index of the lower-index regions are different.

21. The optical component of claim 1, wherein the cross-section is hexagonal.

22. The optical component of claim 1, wherein the cross-section is rectangular.

23. The optical component of claim 1, wherein the longitudinal axis includes a curved portion.

24. The optical component of claim 2, further comprising a metal layer surrounding the outer region to reduce leakage of the EM energy to the surrounding environment.

25. The optical component of claim 1, further comprising a bias source coupled to the dielectric waveguide, wherein during operation the bias source selectively alters the refractive index of a portion of the waveguide to alter the wavevector corresponding to the zero group velocity crossing.

26. A laser comprising:
the dielectric waveguide of claim 1, wherein the dielectric waveguide includes a gain medium; and
an excitation source coupled to the gain medium, wherein during operation the excitation source causes the gain medium to emit photons at a frequency in the region where the group velocity of the EM mode passes from negative values to positive values.

27. The laser of claim 26, wherein the dielectric waveguide comprises a core aligned with the longitudinal axis and multiple layers surrounding the core.

28. The laser of claim 26, wherein the excitation source is an optical source.

29. The laser of claim 26, wherein the excitation source is an electrical source.

30. The laser of claim 27, wherein the gain medium is dispersed within the core.

31. The laser of claim 27, wherein the gain medium is dispersed within one of the layers.

32. The laser of claim 26, further comprising a bias source coupled to the dielectric waveguide, wherein during operation the bias source selectively alters the refractive index of a portion of the waveguide to alter the wavevector corresponding to the zero group velocity crossing.

33. A nonlinear optical method comprising:
providing the dielectric waveguide of claim 1;
coupling an input optical signal into the dielectric waveguide, wherein the input optical signal is at a frequency in the region where the group velocity of the EM mode passes from negative values to positive values; and
receiving an output optical signal produced by a nonlinear optical interaction between the input signal and the dielectric waveguide.

34. A nonlinear optical switch comprising:
the dielectric waveguide of claim 1;
an input channel configured to couple an input optical signal into the dielectric waveguide, wherein the input optical signal is at a frequency in the region where the group velocity of the EM mode passes from negative values to positive values; and
an output channel configured to receive an output optical signal produced by a nonlinear optical interaction between the input signal and the dielectric waveguide.

35. An optical modulator comprising:
the dielectric waveguide of claim 1; and
a bias source coupled to the dielectric waveguide, wherein during operation the bias source selectively alters the refractive index of a portion of the waveguide to alter the region where the group velocity of the EM mode passes from negative values to positive values.

36. The optical modulator of claim 35, wherein the bias source is an optical bias source.

37. The optical modulator of claim 35, wherein the bias source is an electrical bias source.

38. The modulator of claim 35, wherein the alteration of the refractive index causes the frequency of the zero group velocity crossing to change.

39. The modulator of claim 35, wherein the alteration of the refractive index causes the zero group velocity crossing to disappear.

40. A portion of an optical telecommunications network comprising:
an optical transmission line connecting two nodes of the network; and
the dielectric waveguide of claim 1 coupled to the transmission line between the two nodes, the parameters of the waveguide selected to offset group velocity dispersion introduced by the optical transmission line over a range of frequencies.

41. A dispersion compensation method comprising:
providing the waveguide of claim 1;
coupling an input optical signal into the waveguide to impart group velocity dispersion to the signal, wherein the input optical signal is at a frequency in the region where the group velocity of the EM mode passes from negative values to positive values; and
selecting the amount of group velocity dispersion imparted to the signal based on the parameters of the waveguide.

42. The method of claim 41 further comprising:
applying a bias to the waveguide to change the amount of group velocity dispersion imparted to the signal.

43. An optical system comprising: at least two optical paths coupled at one end, wherein each path is configured to carry an optical signal; and
the waveguide of claim 1 positioned along one of the paths, wherein during operation the waveguide introduces a time delay to one of the signal when that signal is at a frequency in the region where the group velocity of the EM mode passes from negative values to positive value.

44. An optical time delay method comprising:
providing the waveguide of claim 1; and
delaying an optical signal by directing it through the waveguide, wherein the signal is at a frequency in the region where the group velocity of the EM mode passes from negative values to positive values.

* * * * *

UNITED STATES PATENT AND TRADEMARK OFFICE
CERTIFICATE OF CORRECTION

PATENT NO.   : 6,909,729 B2
DATED        : June 21, 2005
INVENTOR(S)  : Mihai Ibanescu et al.

It is certified that error appears in the above-identified patent and that said Letters Patent is hereby corrected as shown below:

Title page,
Item [75], Inventors, replace "John D. Joannopoious" with
-- John D. Joannopoulos --.
Item [56], References Cited, FOREIGN PATENT DOCUMENTS, delete "WO00/22446" and "WO00/65386".
OTHER PUBLICATIONS,
"M. Ibaneseu" reference, replace "M. Ibaneseu" with -- M. Ibanescu --;
"F. Brechet" reference, replace "Analyis" with -- Analysis --; and
"F. Brechet" reference (second occurrence), after "Designed" delete first occurrence of "for Zero".

Signed and Sealed this

Twenty-first Day of February, 2006

JON W. DUDAS
*Director of the United States Patent and Trademark Office*